United States Patent Office
2,767,176
Patented Oct. 16, 1956

2,767,176

ORGANOPHILIC BENTONITE AND GREASES PRODUCED THEREFROM

John G. Erickson, Minneapolis, Minn., assignor to General Mills, Inc., a corporation of Delaware No Drawing. Application September 13, 1952, Serial No. 309,563

3 Claims. (Cl. 260—242)

The present invention relates to reaction products of bentonite with polyquaternary ammonium compounds and also to reaction products of bentonite with a combination of polyquaternary ammonium compounds and monoquaternary ammonium compounds containing two fatty groups. These are novel compounds which are particularly useful in the production of greases having unusual properties.

It is known that the reaction products of quaternary ammonium compounds containing two fatty groups with bentonite are useful in the production of greases. The term "bentonite-quaternary ammonium complex" or simply the word "complex" will be used herein to describe this broad law of reaction products. The complex is apparently a salt of the quaternary ammonium compound with the high molecular weight complex acid which occurs in bentonite in the form of the sodium or potassium salt. When these complexes are mixed with hydrocarbons, grease-like gels result. Excellent greases having high flow points and having excellent service lives, can be prepared from heavy mineral oil and these complexes.

It has now been found that the complexes derived from bentonite and polyquaternary ammonium compounds and particularly the complexes derived from bentonite and the combination of polyquaternary ammonium compounds and monoquaternary ammonium compounds containing two fatty groups, have unusual properties and are particularly adapted for use in the production of gelled greases.

It is, therefore, an object of the present invention to provide novel complexes derived from polyquaternary ammonium compounds and bentonite, and also novel complexes derived from polyquaternary ammonium compounds and monoquaternary ammonium compounds containing two fatty groups, and bentonite.

It is a further object of the present invention to provide novel greases prepared from the products referred to above.

The fundamental phase of the invention is the complex derived from a polyquaternary ammonium compound and bentonite. Bentonite occurs in the form of minute platelets which are microscopic in size. The polyquaternary compound reacts with the salt groups in the platelets to effect cross linking between the platelets. These preliminary complexes can be reacted with a monoquaternary ammonium compound containing two fatty groups. This reaction produces a further complex which contains the fatty quaternary ammonium group resulting from the reaction of the fatty quaternary compound with further salt groups in the bentonite.

The polyquaternary compounds which can be used in the present invention are of a wide variety. The term "polyquaternary," as used herein, is intended to include compounds which include two or more quaternary ammonium groups. The nitrogen atoms of the polyquaternary compounds can be separated by hydrocarbon groups such as methylene, ethylene, propylene and the like, or by groups containing hetero atoms, such as oxygen, nitrogen and sulphur. The group intervening between the nitrogen atoms can be straight or branched chain, and can contain aromatic or heterocyclic nuclei. In polyquaternary ammonium compounds containing more than two quaternary ammonium groups the groups intervening between the various nitrogen atoms can be alike or different.

A wide variety of substituents can be present on the nitrogen atoms. These include simple aliphatic hydrocarbon groups, either saturated or unsaturated such as methyl, ethyl, propyl, dodecyl, octadecyl and the like; and aryl or heterocyclic groups such as phenyl, tolyl, thienyl, pyridyl and the like. Similarly, the nitrogen in the quaternary ammonium group can be a part of a heterocyclic ring as in the case of a pyridinum group, morpholinium group and the like. The anions associated with the quaternary ammonium groups can be alike or different. Typical anions include the halides (chloride, bromide, iodide), nitrate, sulphate, phosphate, acetates, formates, chloroacetates, oxalates, and benzoates. Preferably, the polyquaternary compounds should not contain groups intervening between the quaternary ammonium groups which are unstable, or which might be likely to cleave either during the reaction with the bentonite or at some stage in the use of the compound.

While any polyquaternary ammonium compound may be used for the purpose of the present invention, and while they may be made by any of the conventional methods, a great variety of polyquaternary ammonium compounds is available by the simple reaction of amines with polyhalogen compounds. The preferred polyquaternary ammonium compounds are those which are essentially linear, or which are of the simple, branched chain variety, as distinguished from the cross-linked variety. It is also possible to employ polyquaternary ammonium compounds which are composed of linear polymers cross-linked to a greater or lesser extent. Of the cross-linked polymers, those having a lower degree of cross-linking are preferred. Of all the polyquaternary ammonium compounds the simpler straight chain compounds are preferred. The polyquaternary ammonium compounds prepared from tertiary monoamines and polyhalogen compounds are extremely desirable because of the ready availability of the starting materials and the simplicity of their reaction. It should be pointed out that when secondary amines are employed for the preparation of the quaternary ammonium compounds, the polyhalogen compound should have either less than 4 or more than 5 atoms separating adjacent halogen atoms in order to avoid the formation of cyclic compounds containing only 1 quaternary ammonium group.

The preferred amines for the preparation of the quaternary ammonium compounds are the aliphatic secondary and tertiary monoamines in which the substituents on the nitrogen atoms contain preferably from 8–22 carbon atoms. Other monoamines having substituents containing from 1–8 carbon atoms may also be employed, but the presence of the fatty groups on the nitrogen is preferred. Other preferred amines are the secondary and tertiary polyamines in which the amine groups are separated by hydrocarbon groups, either straight or branched chain, containing from 2–6 carbon atoms; or by polyoxalkylene groups containing from 2–6 recurring units and each alkylene group containing from 2–6 carbon atoms. The nitrogen atoms may be further substituted by aliphatic hydrocarbon substituents, either short chain or long chain, but those substituents containing from 8–22 carbon atoms are preferred. Typical amines which are useful in preparing the polyquaternary ammonium compounds include the following alkylamines, aromatic amines, and cyclic amines: dimethylaniline, trimethylamine, diethylamines, dibutylamine, triethanolamine, iminodipropionitrile, tripropylamine, dioctadecylamine, didodecylamine, N-methyl-p-toluidine, N,N-dimethylbenzylamine, 2-dimethylamino-thiophene, piperidine, pyridine, γ-picoline, pyrrolidine, morpholine, quinoline, N-hydroxyethylmorpholine, N, N, N', N'-tetradodecylethylenediamine, 1,2 - bis(2 - dimethylaminoethoxy)-ethane, 1,3-dipiperid-1-ylpropane and N-[2-(2-dibutylaminoethoxy)ethyl]-morpholine.

The polyhalogen compounds used for preparing the polyquaternary ammonium compounds are preferably those in which the halogen atoms are separated by hydrocarbon groups, either straight or branched chain, containing from 2–6 carbon atoms; or by polyoxyalkylene groups containing from 2–6 recurring units, each alkylene group containing from 2–6 carbon atoms. Typical polyhalogen compounds include ethylene dichloride, ethylene dibromide, propylene dichloride, propylene dibromide, 2-chloroethyl ether, tri- and tetraglycol dichlorides, 2-chloroethyl sulfide, 1,5-diiodopentane, 1,4-dichlorobutane, p-bis(chloromethyl)benzene. The proper combination of amine and halogen compound should be selected to produce the desired polyquaternary ammonium compound.

These amines and polyhalogen compounds may be reacted in accordance with known methods to produce the polyquaternary ammonium compounds. Where tertiary polyamines are used, the product is a polyquaternary ammonium compound which may possess terminal halogen or amine groups. The terminal amine groups may or may not be further alkylated, in any conventional manner, depending on the number of quaternary ammonium groups desired in the compound. Where secondary amines are employed, it will be apparent that the amino groups must be alkylated twice to produce the quaternary ammonium compounds. The second alkylation may be by means of a mono or polyhalogen compound. The product obtained by the use of a polyhalogen compound may possess terminal halogen atoms or secondary or tertiary amine groups. Similarly, these terminal amine groups may or may not be alkylated further, depending on the number of quaternary ammonium groups desired in the product. In general, from 2–5 quaternary ammonium groups in the compound are sufficient for the purposes of the present invention, and no great advantage is obtained with compounds having a larger number of such groups.

The list appearing below includes polyquaternary ammonium compounds which can be used in the present invention. The list includes complete polyquaternary ammonium compounds as well as recurring groups which of themselves can contain a plurality of polyquaternary ammonium groups or which can contain only a single quaternary ammonium group. Where the recurring group is indicated as containing a plurality of quaternary ammonium groups, the compound can be monomeric, in which case the remaining valences can be satisfied by hydrogen or some other group, or the compound can be polymeric, containing a number of the indicated recurring groups. Where the recurring group contains only a single quaternary ammonium group, the compound obviously must be composed of at least two such recurring groups.

(1) 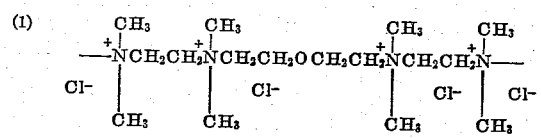

(2) 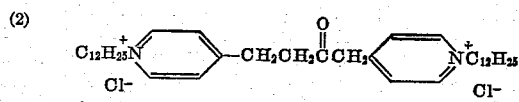

(3) 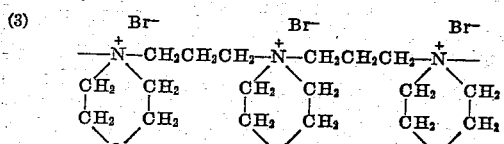

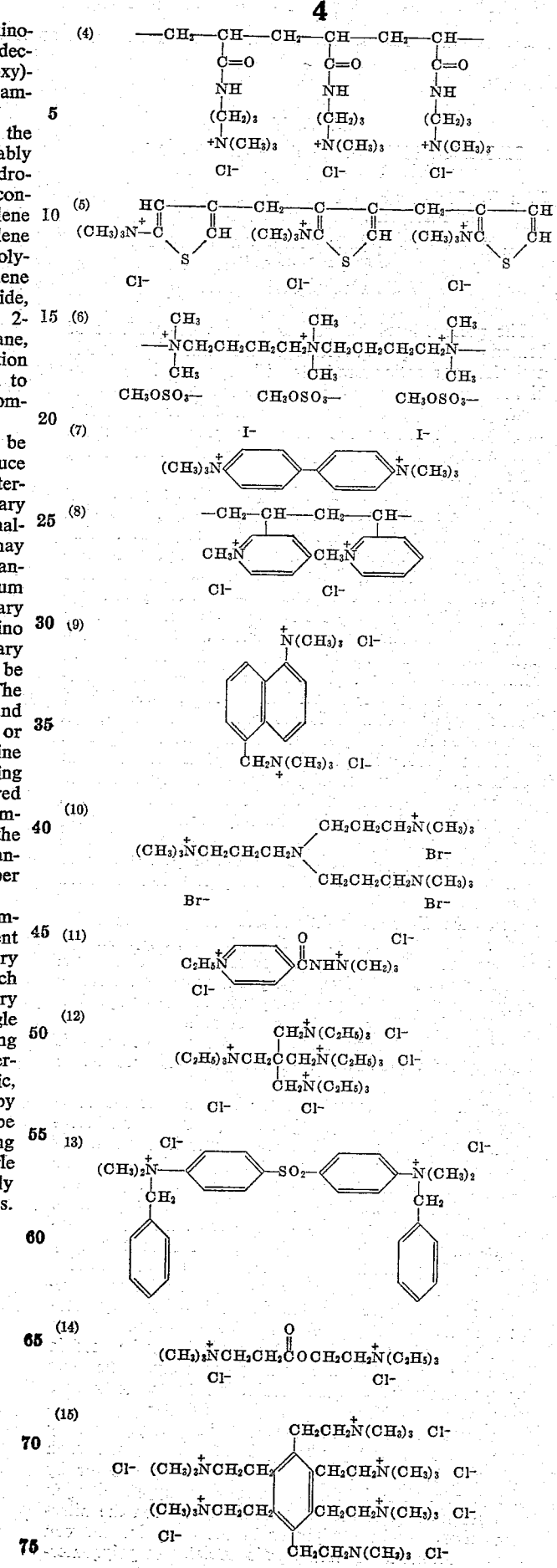

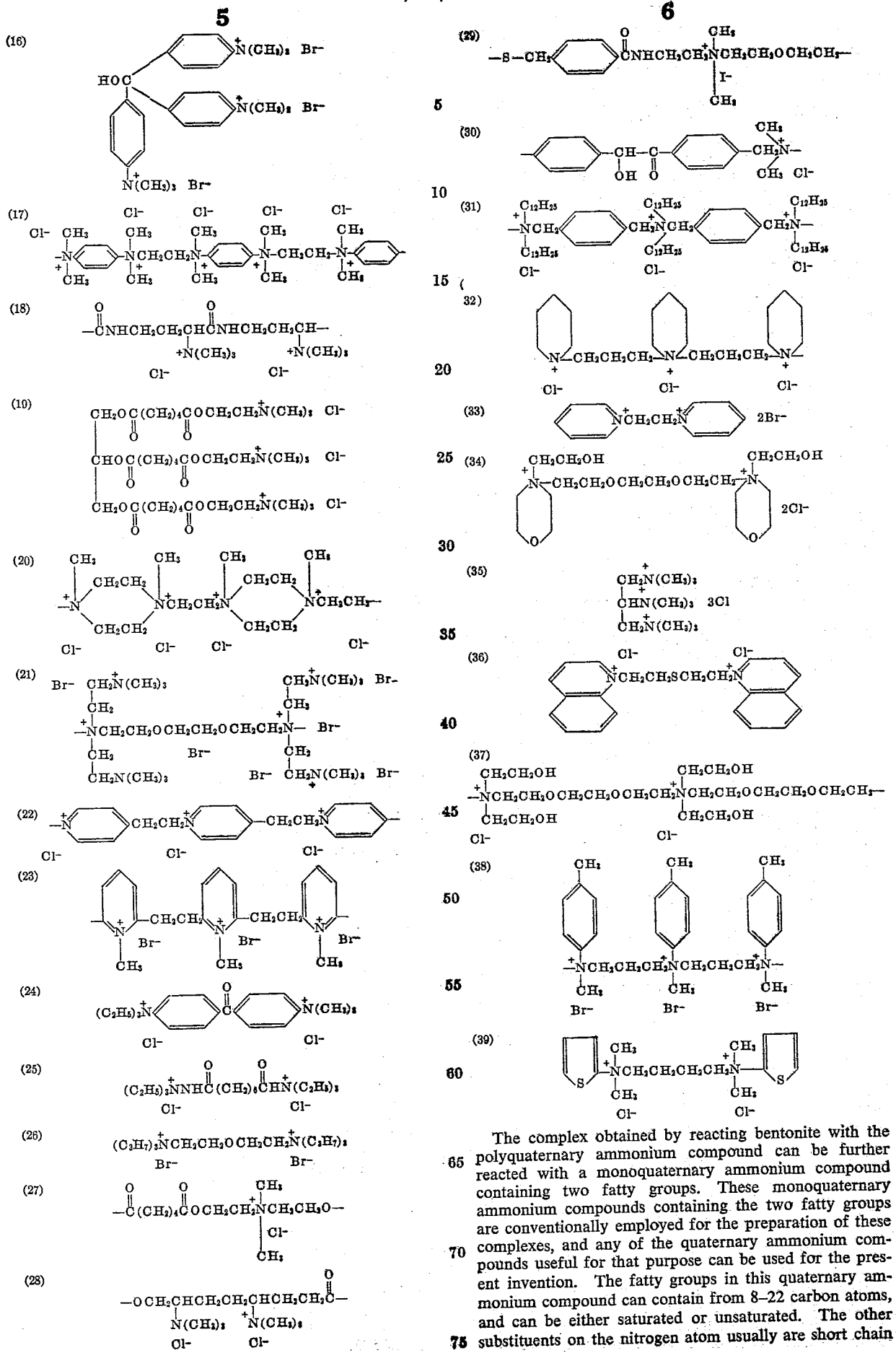

The complex obtained by reacting bentonite with the polyquaternary ammonium compound can be further reacted with a monoquaternary ammonium compound containing two fatty groups. These monoquaternary ammonium compounds containing the two fatty groups are conventionally employed for the preparation of these complexes, and any of the quaternary ammonium compounds useful for that purpose can be used for the present invention. The fatty groups in this quaternary ammonium compound can contain from 8–22 carbon atoms, and can be either saturated or unsaturated. The other substituents on the nitrogen atom usually are short chain alkyl groups containing from 1–4 carbon atoms. The anion on the monoquaternary ammonium compound can be any of the anions mentioned above in reference to the polyquaternary ammonium compounds. In addition, the quaternary ammonium compounds can contain a heterocyclic nucleus such as in the case of the difatty morpholinium halide.

In general, it is preferred to employ sufficient of the monoquaternary ammonium compound and the polyquaternary ammonium compound to react with all of the salt groups of the bentonite molecule in order to introduce as many of the quaternary groups as possible. Furthermore, the best results are obtained when less than one equivalent of the polyquaternary ammonium compound is used for each ten equivalents of the monoquaternary ammonium compound containing the two fatty groups. The equivalent weight of the quaternary ammonium compounds is the molecular weight of the compound divided by the number of quaternary ammonium groups present therein. It is not possible to specify precisely the amount of polyquaternary ammonium compound to use, since this depends upon the nature of the hydrocarbon to be gelled, the nature of the quaternary compound, and the use to which the grease is to be put. It has definitely been established, however, that some of the polyquaternary ammonium compound is required to accomplish the purposes of the invention, and that the one equivalent per ten equivalents of the monoquaternary ammonium compound appears to be near the upper limit.

In preparing the complex, the bentonite is dispersed in water in the form of a dilute dispersion, for example, a 1% dispersion. The quaternary compounds are then dissolved in a suitable solvent, such as water or a lower aliphatic alcohol, for example, methanol or ethanol and these solutions are then added to the bentonite dispersion. The quaternary ammonium compounds can be in the form of a single solution, or in the form of separate solutions, either of which can be added first. The reaction is carried out preferably at room temperature, and involves the simple admixing of the quaternary ammonium solution with the bentonite dispersion. In the case of the product derived solely from the bentonite and the polyquaternary ammonium compound, the complex may or may not appear as a flocculent precipitate. If a flocculent precipitate is formed, it can be separated by filtration and recovered. If the reaction mixture remains a more or less homogeneous dispersion, the product can be recovered by drying. In the case of the complex derived from both the mono and the polyquaternary ammonium compounds with the bentonite, the product appears as a flocculent precipitate which comes down almost immediately upon admixing the quaternary compounds with the bentonite dispersion. The product can readily be recovered by filtration and drying.

The combined complex of bentonite with the polyquaternary ammonium compound and with the monoquaternary ammonium compound can be used to gel organic materials which are essentially hydrocarbon in character. These include the ordinary petroleum hydrocarbons, mineral oils, lubricating oils, aromatic liquid hydrocarbons, as well as halogen hydrocarbons. In preparing these gels, the complex described above is reduced to a finely divided powder and then incorporated into the oil and thoroughly distributed therethrough. This can be accomplished by means of a colloid mill or a paint mill. The products in general are extremely stiff greases. The comparative stiffness of these greases has been determined by measuring the load in grams necessary to start rotation of a spindle (in the form of a bent steel rod) attached to a Stormer viscosity machine. The higher the load required to rotate the spindle in the grease, the greater the stiffness. In general, the stiffness of the grease produced from the complex derived from the combination of the monoquaternary ammonium compound and the polyquaternary ammonium compound is several times that of comparable greases made with the complex derived from the monoquaternary compound alone. Some of these results will be evident from the following examples.

Another factor which is important in greases of this type is the ability of the grease to hold the oil and to keep it from separating from the grease. The examples will likewise demonstrate superiority in this respect over the ordinary bentone greases.

Example 1

A mixture of 80.3 parts of diethylamine, 74.8 parts of triglycol dichloride and 160 parts of butyl alcohol was reflexed for 19 hours. It was then filtered and stripped of solvent under reduced pressure. The residue was mixed with benzene, washed with concentrated sodium hydroxide solution and water, and then distilled to give 1,2 - bis(2 - diethylaminoethoxy)ethane, a colorless liquid boiling at 85–100° C. at 0.05–0.10 mm. of mercury.

A mixture of 26 parts of this diamine, 9.3 parts of triglycol dichloride, and 40 parts of butyl alcohol was refluxed for several days, then stripped of solvent to yield a mixture of polymeric quaternary ammonium compounds containing from 2–5 or more quaternary ammonium groups. A bentonite complex was prepared from 1000 parts of a 1% bentonite dispersion in water, 5.5 parts of dioctadecyldimethyl ammonium chloride and 0.089 parts of the polyquaternary ammonium compound described above. The polyquaternary ammonium compound was employed in the form of an aqueous solution, whereas the monoquaternary ammonium compound was employed in the form of an isopropyl alcohol solution. The complex was recovered and dried, and then milled into heavy mineral oil in a concentration of 10% based on the weight of the final grease. This gave a very thick grease having a stiffness value of 1000. By way of comparison, a similar grease at the 10% solids concentration prepared from the complex derived from bentonite and dioctadecyldimethyl ammonium chloride, had a stiffness of only 125. Both greases were diluted and milled down to a 5% solids concentration by the addition of more oil. The grease prepared from the combination of quaternary ammonium compounds had a stiffness of 100, whereas the grease prepared from the monoquaternary ammonium compound alone was a very soft grease. None of the greases leaked oil, with the exception of the one prepared from the monoquaternary ammonium compound alone at the 5% solids concentration.

Example 2

A solution of 0.156 parts of

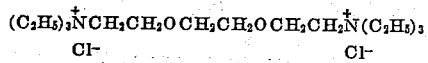

(obtained from triethylamine and triglycol dichloride) in water was added to 2000 parts of 1% bentonite dispersion in water. A solution of 11.0 parts of dioctadecyldimethylammonium chloride in isopropyl alcohol was then added. A precipitate appeared, was filtered off, and dried. When milled into heavy mineral oil at a 10% solids content, it gave a stiff grease, stiffness value of 400.

A similar grease, prepared as described above except that no diquaternary compound was added, had a stiffness value of 125.

Example 3

A bentonite complex was prepared as described in Example 2, using 2000 parts of 1% aqueous bentonite dispersion, 11.0 parts of dimethyldioctadecylammonium chloride and 0.33 part of the diquaternary ammonium compound obtained from octadecylmorpholine and 2-chloroethyl ether. This complex was milled into mineral oil at 10% solids content, giving a grease having a stiffness of 575.

A similar grease, prepared without the diquaternary compound, had a stiffness of 125.

Example 4

A bentonite complex was prepared as described in example 2, using 1000 parts of 1% bentonite dispersion, 5.5 parts of dioctadecyldimethylammonium chloride and 0.19 part of a polyquaternary ammonium compound obtained by heating N, N, N', N',-tetradodecyl-1,3 propanediamine with 1,3-dibromopropane. When this was milled into mineral oil at 10% solids content, it gave a very heavy grease having a stiffness value of 1125. This was milled down to 5% solids content by adding more mineral oil. The grease so obtained had a stiffness of 300 and did not separate oil on standing.

A similar grease (10% solids), prepared without the polyquaternary compound had a stiffness of 125. When milled down to 5% solids, it gave a very soft grease which separated oil on standing overnight.

Example 5

A bentonite complex was prepared as described in example 2, using 288 parts of 1% bentonite dispersion, 1.7 parts of dioctadecylmorpholinium chloride and 0.028 part of the polyquaternary ammonium compound obtained by heating N, N, N', N',-tetradodecyl-1,3 propanediamine with trimethylene bromide. When this complex was milled into mineral oil at 10% solids content it gave a very thick grease having stiffness value of 1500. This was milled down to 5% solids content by adding more mineral oil. The grease so obtained had stiffness of 500. Further dilution to 2½% solids gave a grease with a stiffness of 100.

A similar grease (10% solids), prepared without the polyquaternary compound, had a stiffness of 600.

Example 6

A mixture of 5.3 parts of tetraoctadecylethylenediamine and 0.70 part of ethylene chloride was heated to 95° C. for 66 hours. The mixture was then heated with a low boiling hydrocarbon, cooled and filtered to yield 1,1,4,4 - tetraoctadecylpiperazinium dichloride. After crystallization from a mixture of chloroform and the low boiling hydrocarbon, the product melted at 177.5–179.5° C.

0.23 part of this compound was dissolved in isopropyl alcohol and added to 1000 parts of 1% aqueous bentonite dispersion. A solution of 5.5 parts of the dimethyldioctadecylammonium chloride in isopropyl alcohol was then added. The precipitate was filtered, washed, and dried. When milled into heavy mineral oil at 10% solids, it gave a grease having a stiffness of 800.

A similar complex prepared without the piperazinium compound, gave a 10% grease having a stiffness of 125.

Example 7

A bentonite complex was prepared as described in Example 1, using 1000 parts of 1% bentonite dispersion, 5.5 parts of dimethyldioctadecylammonium chloride and 0.07 part of the diquaternary compound

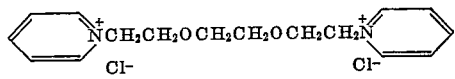

obtained from pyridine and triglycol dichloride. When this complex was milled into mineral oil at 10% solids content, it gave a grease having a stiffness value of 500. A similar grease, without the polyquaternary compound had a stiffness of 125.

Example 8

A bentonite complex was prepared as described in Example 1, using 1000 parts of 1% bentonite dispersion, 5.5 parts of dimethyldioctadecylammonium chloride and 1 part of a 5% aqueous solution of the polymer of allyl-triethylammonium chloride. This polymer had the recurring group

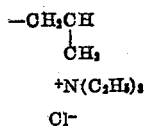

and was composed of a mixture of compounds having on the average four to five of such recurring groups. When this complex was milled into mineral oil at 10% solids content, it gave a grease having a stiffness of 700.

A similar grease, without the polyquaternary compound, had a stiffness of 125.

Example 9

A mixture of 73.3 parts of the above-tetradodecylethylenediamine, and 20 parts of ethylene bromide was heated on a steam bath (95° C.) for 17 hours. The mixture was diluted with a low boiling hydrocarbon, cooled and filtered to yield 1,1,4,4-tetradodecylpiperazinium dibromide. After crystallization from a mixture of benzene and the low boiling hydrocarbon, the product melted at 217–220° C.

1,1,4,4-tetradodecylpiperazinium dibromide was dissolved in isopropyl alcohol. This solution was then added to an aqueous dispersion of bentonite containing about 1% by weight of solids. As the mixture was warmed on the steam bath, the milkiness of the dispersion disappeared and a flocculent precipitate appeared. This precipitate was filtered off, washed with water and isopropyl alcohol and dried. When stirred and warmed with toluene, it formed a grease-like gel.

While in the examples the monoquaternary ammonium compounds employed were dioctadecyl compounds, these compounds were employed largely for comparative purposes. The fatty groups in the monoquaternary ammonium compound can be varied as described previously, and the same general results are obtained. It is preferred, however, to employ fatty groups containing from 16–18 carbon atoms.

The present invention is a continuation-in-part of my copending application, Serial No. 279,253, filed March 28, 1952, now Patent No. 2,698,847 entitled Substituted Piperazinium Dihalides.

I claim as my invention:

1. A bentonite complex consisting essentially of the reaction product of bentonite and (a) a polyquarternary ammonium compound having from 2–5 quaternary ammonium groups, said polyquaternary ammonium compound being the reaction product of (1) an amine selected from the group consisting of tertiary monoamines and tertiary diamines, the nitrogen atoms of said amines being selected from the group consisting of nitrogen atoms in a heterocyclic ring and alkyl substituted nitrogen atoms in which the alkyl substituents contain from 1–22 carbon atoms and (2) a dihalide selected from the group consisting of dihalides in which the halogen atoms are separated by an alkylene group containing from 2–6 carbon atoms and dihalides in which the halogen atoms are separated by a polyoxyalkylene group containing from 2–6 recurring units, each alkylene group containing from 2–6 carbon atoms, and (b) a monoquaternary ammonium compound having two long chain alkyl groups attached to the nitrogen atom, each of said long chain alkyl groups containing from 8–22 carbon atoms, said nitrogen atom being selected from the group consisting of nitrogen atoms substituted with two short chain alkyl groups containing from 1–4 carbon atoms and nitrogen atoms forming part of a heterocyclic ring, the quantity of (a) being less than one equivalent per ten equivalents of (b) but sufficient to materially stiffen a grease made from said complex, the total quantity of (a) and (b) being such that substantially all of the exchangeable metal cation in the bentonite is replaced by the cations of (a) and (b).

2. A bentonite complex consisting essentially of the reaction product of bentonite and (a) a polyquaternary ammonium compound having from 2-5 quaternary ammonium groups, said polyquaternary ammonium compound being the reaction product of (1) an amine selected from the group consisting of tertiary monoamines and tertiary diamines, the nitrogen atoms of said amines being selected from the group consisting of nitrogen atoms in a heterocyclic ring and alkyl substituted nitrogen atoms in which the alkyl substituents contain from 1-22 carbon atoms and (2) a dihalide selected from the group consisting of dihalides in which the halogen atoms are separated by an alkylene group containing from 2-6 carbon atoms and dihalides in which the halogen atoms are separated by a polyoxyalkylene group containing from 2-6 recurring units, each alkylene group containing from 2-6 carbon atoms, and (b) a monoquaternary ammonium compound having two long chain alkyl groups, each containing from 8-22 carbon atoms and two short chain alkyl groups containing from 1-4 carbon atoms attached to the nitrogen atom, the quantity of (a) being less than one equivalent per ten equivalents of (b) but sufficient to materially stiffen a grease made from said complex, the total quantity of (a) and (b) being such that substantially all of the exchangeable metal cation in the bentonite is replaced by the cations of (a) and (b).

3. A bentonite complex consisting essentially of the reaction product of bentonite and (a) a polyquaternary ammonium compound containing from 2-5 quaternary ammonium groups, said polyquaternary ammonium compound being the reaction product of (1) an amine selected from the group consisting of tertiary monoamines and tertiary diamines, the nitrogen atoms of said amines being selected from the group consisting of nitrogen atoms in a heterocyclic ring and alkyl substituted nitrogen atoms in which the alkyl substituents contain from 1-22 carbon atoms and (2) a dihalide selected from the group consisting of dihalides in which the halogen atoms are separated by an alkylene group containing from 2-6 carbon atoms and dihalides in which the halogen atoms are separated by a polyoxyalkylene group containing from 2-6 recurring units, each alkylene group containing from 2-6 carbon atoms, and (b) a mono-quaternary ammonium compound having two alkyl groups attached to the nitrogen atom, each of said alkyl groups containing from 8-22 carbon atoms, said nitrogen atom being part of a heterocyclic ring, the quantity of (a) being less than one equivalent per ten equivalents of (b), but sufficient to materially stiffen a grease made from said complex, the total quantity of (a) and (b) being such that substantially all of the exchangeable metal cation in the bentonite is replaced by the cations of (a) and (b).

References Cited in the file of this patent
UNITED STATES PATENTS

| | | |
|---|---|---|
| 2,531,396 | Carter et al. | Nov. 28, 1950 |
| 2,531,427 | Hauser | Nov. 28, 1950 |
| 2,531,440 | Jordan | Nov. 28, 1950 |
| 2,559,398 | Capell | July 3, 1951 |
| 2,626,241 | Sparks et al. | Jan. 20, 1953 |
| 2,698,847 | Erickson | Jan. 4, 1955 |